(12) United States Patent
Broughton

(10) Patent No.: US 9,869,823 B1
(45) Date of Patent: Jan. 16, 2018

(54) SELF-SEALING HYBRID POWER/FIBER CONNECTOR

(71) Applicant: CommScope Technologies LLC, Hickory, NC (US)

(72) Inventor: Adam V. Broughton, Harrisburg, PA (US)

(73) Assignee: CommScope Technologies, Hickory, NC (US)

( * ) Notice: Subject to any disclaimer, the term of this patent is extended or adjusted under 35 U.S.C. 154(b) by 0 days.

(21) Appl. No.: 15/615,044

(22) Filed: Jun. 6, 2017

Related U.S. Application Data

(60) Provisional application No. 62/367,853, filed on Jul. 28, 2016.

(51) Int. Cl.
| | |
|---|---|
| *G02B 6/38* | (2006.01) |
| *H01R 33/945* | (2006.01) |
| *H01R 13/00* | (2006.01) |
| *H01R 13/623* | (2006.01) |
| *H01B 11/22* | (2006.01) |

(52) U.S. Cl.
CPC ........... *G02B 6/3817* (2013.01); *G02B 6/389* (2013.01); *G02B 6/3849* (2013.01); *H01R 13/623* (2013.01); *H01B 11/22* (2013.01)

(58) Field of Classification Search
CPC .... G02B 6/3817; G02B 6/3849; G02B 6/389; G02B 6/4201; H01B 11/22; H01R 13/623
USPC ..... 385/53–94; 439/271, 277, 278, 578–585, 439/587, 589
See application file for complete search history.

(56) References Cited

U.S. PATENT DOCUMENTS

| | | | | |
|---|---|---|---|---|
| 5,191,633 | A | * | 3/1993 | von Bagh ......... C03B 37/01884 385/147 |
| 5,489,274 | A | | 2/1996 | Chu et al. |
| 6,739,759 | B1 | * | 5/2004 | Seeley ................. G02B 6/3849 385/60 |
| 2014/0106592 | A1 | | 4/2014 | Purdy et al. |
| 2015/0155654 | A1 | * | 6/2015 | Ferry ................. H01R 13/6271 439/370 |

FOREIGN PATENT DOCUMENTS

WO    WO 2008/036935 A2    3/2008

OTHER PUBLICATIONS

Notification of Transmittal of the International Search Report and the Written Opinion of the International Searching Authority, or the Declaration corresponding to International Application No. PCT/US2017/036047; dated Aug. 22, 2017.

\* cited by examiner

*Primary Examiner* — Akm Enayet Ullah
*Assistant Examiner* — Michael Mooney
(74) *Attorney, Agent, or Firm* — Myers Bigel, P.A.

(57) ABSTRACT

A connector interface includes: a first connector having an outer body with a first bearing surface facing in a first axial direction; a second connector having an outer body with a second bearing surface facing in a second axial direction opposite the first axial direction; a resilient sealing element disposed between the first and second bearing surfaces; and a coupling nut associated with the first connector and configured to engage a feature on the second connector. Rotation of the coupling nut relative to the first and second connectors draws the first and second bearing surfaces toward each other to compress the sealing element such that the sealing element bulges radially outwardly to engage an inner surface of the coupling nut.

14 Claims, 2 Drawing Sheets

SELF-SEALING HYBRID POWER/FIBER CONNECTOR

RELATED APPLICATION

The present application claims priority from and the benefit of U.S. Provisional Patent Application No. 62/367,853, filed Jul. 28, 2016, the disclosure of which is hereby incorporated herein in its entirety.

FIELD OF THE INVENTION

The present invention is directed generally to electrical cable connectors, and more particularly to coaxial connectors for electrical cable.

BACKGROUND OF THE INVENTION

Latest developments in technology for delivering power and data in wireless infrastructure use hybrid cables, wherein the term "hybrid cable" is intended to mean a cable that includes both power conductors and one or more fiber optic cords or cables. An exemplary hybrid cable is the HFF cable, available from CommScope, Inc. (Joliet, Ill.). Unlike RF-based systems, a single hybrid trunk cable can be used to power multiple sectors, thereby eliminating multiple runs of RF cable.

In order to use a single hybrid trunk cable, at some point the trunk cable must transition to jumper cables. Typically, these are distributed inside an enclosure that transitions the trunk conductor gauge to the jumper conductor gauge and connects the optical fibers in the trunk to the optical fibers in the jumper cables. Exemplary enclosures are described in U.S. patent application Ser. No. 14/448,269, filed Jul. 31, 2104, and Ser. No. 15/071,620, filed Mar. 16, 2016, the disclosure of each of which is hereby incorporated herein in its entirety. The enclosures discussed therein employ hybrid power/fiber connectors (also called "multi-media" connectors) that are connected with hybrid jumper cables.

Because they are often employed outdoors (e.g., at the top of an antenna tower), hybrid connectors include sealing elements (such as gaskets, O-rings and the like) to maintain watertightness at the interface. The inclusion of sealing elements can increase the cost of the connectors. It may be desirable to provide additional designs for connectors that provide sealing capability.

SUMMARY

As a first aspect, embodiments of the invention are directed to a connector interface, comprising: a first connector having an outer body with a first bearing surface facing in a first axial direction; a second connector having an outer body with a second bearing surface facing in a second axial direction opposite the first axial direction; a resilient sealing element disposed between the first and second bearing surfaces; and a coupling nut associated with the first connector and configured to engage a feature on the second connector. Rotation of the coupling nut relative to the first and second connectors draws the first and second bearing surfaces toward each other to compress the sealing element such that the sealing element bulges radially outwardly to engage an inner surface of the coupling nut.

As a second aspect, embodiments of the invention are directed to a connector interface, comprising: a first connector having an outer body with a first bearing surface facing in a first axial direction; a second connector having an outer body with a second bearing surface facing in a second axial direction opposite the first axial direction, the second connector being mounted to an enclosure, wherein each of the first and second connectors includes a plurality of optical fibers and a plurality of electrical conductors; a resilient sealing element disposed between the first and second bearing surfaces; and a coupling nut associated with the first connector and configured to engage a feature on the second connector. Rotation of the coupling nut relative to the first and second connectors draws the first and second bearing surfaces toward each other to compress the sealing element such that the sealing element bulges radially outwardly to engage an inner surface of the coupling nut.

As a third aspect, embodiments of the invention are directed to a connector interface, comprising: a first connector having an outer body with a first bearing surface facing in a first axial direction; a second connector having an outer body with a second bearing surface facing in a second axial direction opposite the first axial direction, the second connector being mounted on an enclosure, wherein each of the first and second connectors includes a plurality of optical fibers and a plurality of electrical conductors; a resilient sealing element disposed between the first and second bearing surfaces; and a coupling nut associated with the first connector and configured to engage a feature on the second connector. Rotation of the coupling nut relative to the first and second connectors draws the first and second bearing surfaces toward each other to compress the sealing element such that the sealing element bulges radially outwardly to engage an inner surface of the coupling nut.

DETAILED DESCRIPTION

The present invention is described with reference to the accompanying drawings, in which certain embodiments of the invention are shown. This invention may, however, be embodied in many different forms and should not be construed as limited to the embodiments that are pictured and described herein; rather, these embodiments are provided so that this disclosure will be thorough and complete, and will fully convey the scope of the invention to those skilled in the art. It will also be appreciated that the embodiments disclosed herein can be combined in any way and/or combination to provide many additional embodiments.

Unless otherwise defined, all technical and scientific terms that are used in this disclosure have the same meaning as commonly understood by one of ordinary skill in the art to which this invention belongs. The terminology used in the below description is for the purpose of describing particular embodiments only and is not intended to be limiting of the invention. As used in this disclosure, the singular forms "a", "an" and "the" are intended to include the plural forms as well, unless the context clearly indicates otherwise. It will also be understood that when an element (e.g., a device, circuit, etc.) is referred to as being "connected" or "coupled" to another element, it can be directly connected or coupled to the other element or intervening elements may be present. In contrast, when an element is referred to as being "directly connected" or "directly coupled" to another element, there are no intervening elements present.

Figure 1:
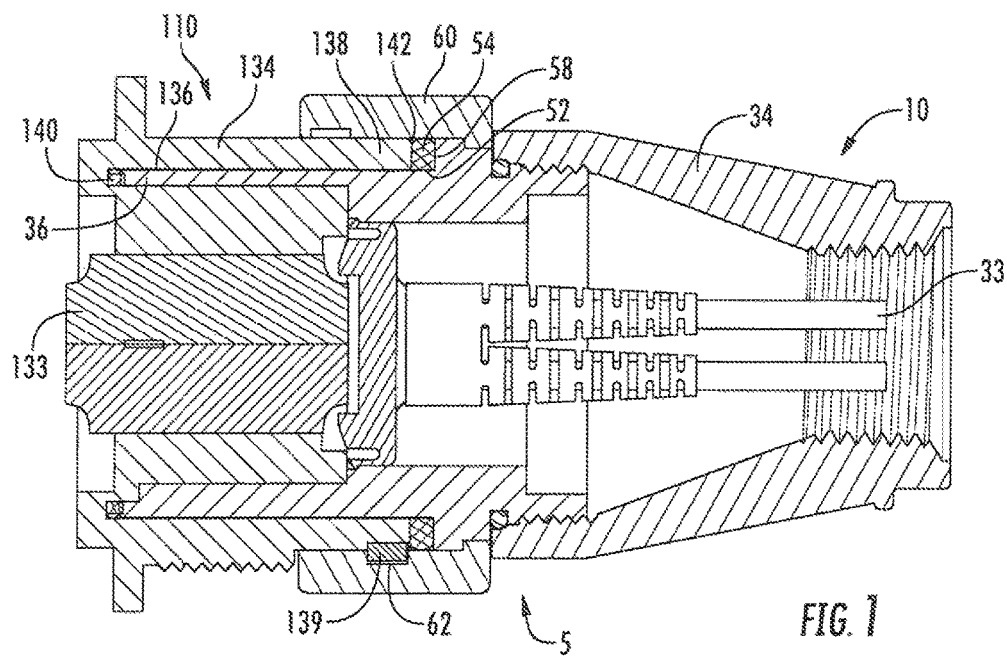
FIG. 1 is a cross-section of a pair of mated hybrid power/fiber connectors according to embodiments of the invention, with the conductors removed for clarity.
Figure 2:
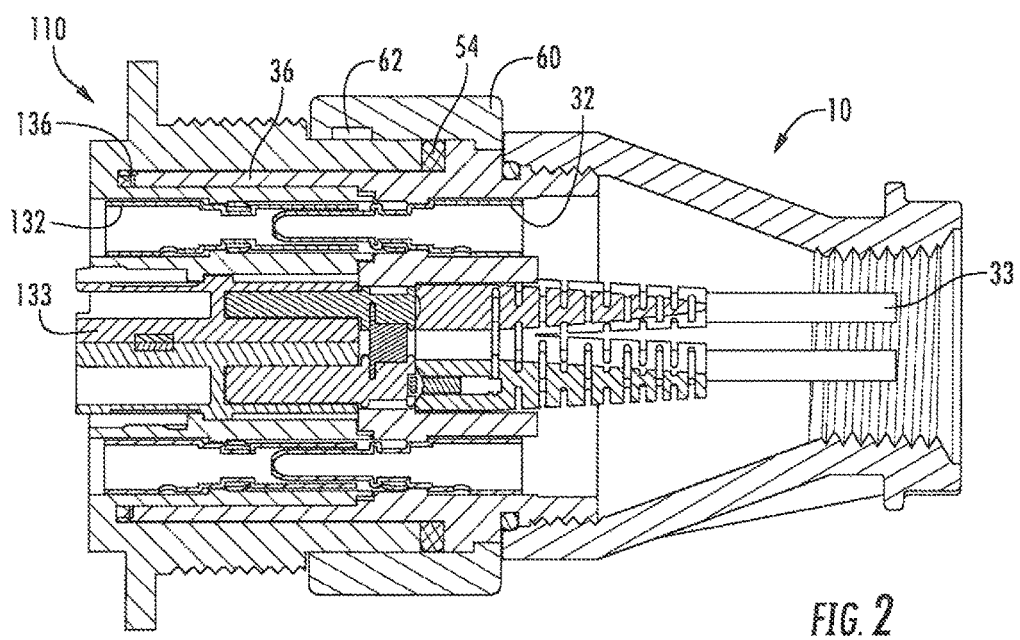
FIG. 2 is a cross-section of the pair of mated hybrid power/fiber connectors of FIG. 1, with the conductors included.

Referring now to FIGS. 1 and 2, two mated hybrid connectors 10, 110 that form an interface 5 are shown therein. Each of the hybrid connectors 10, 110 includes a respective outer body 34, 134. Power conductor contacts 32, 132 (shown in FIG. 2) and fiber optic adapters 33, 133 (shown in FIGS. 1 and 2) are present within their respective outer bodies 34, 134. The outer body 34 has an annular mating ring 36 that extends forwardly; the outer body 134 has an annular groove 136 that receives the mating ring when the connectors 10, 110 are mated. A radially-outwardly-extending nub 139 is positioned near the end of the free end 138 (FIG. 1) of the outer body 134.

Figure 3:
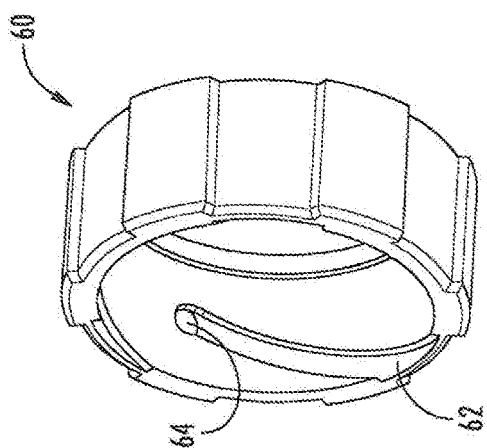
FIG. 3 is a perspective view of the coupling nut of one of the connectors of FIG. 1.

A coupling nut 60 encircles the outer body 34. The coupling nut 60 includes three angled slots 62 (FIG. 3) on its inner surface, each of which extends approximately 120 degrees.

As can be seen in FIGS. 1 and 2, an annular sealing element 54 (typically formed of a resilient material such as silicone) is located radially inwardly of the coupling nut 60. A shallow recess 52 is present in the outer body 34 to receive the sealing element 54. A radially-extending bearing surface 58 on the outer body 34 is adjacent the sealing element 54.

As can be seen in FIGS. 1 and 2, in the mated condition, the mating ring 36 extends forwardly from the outer body 34 into the groove 136 (an o-ring 140 provides a seal at the floor of the groove 136). The free end 138 of the outer body 134 has a bearing surface 142 that contacts the sealing element 54. Thus, the sealing element 54 is sandwiched between the bearing surface 142 of the connector 110 and the bearing surface 58 of the connector 10.

Once the connectors 10, 110 are mated, the coupling nut 60 is rotated until one of the angled slots 62 aligns with the nub 139. After the nub 139 slips into the slot 62, continued rotation of the coupling nut 60 forces the connectors 10, 110 toward each other. This movement continues until the nub 138 reaches the end of the slot 62, where a recess 64 can capture the nub 138 and prevent counter-rotation that could loosen the nut 60.

Figure 4:
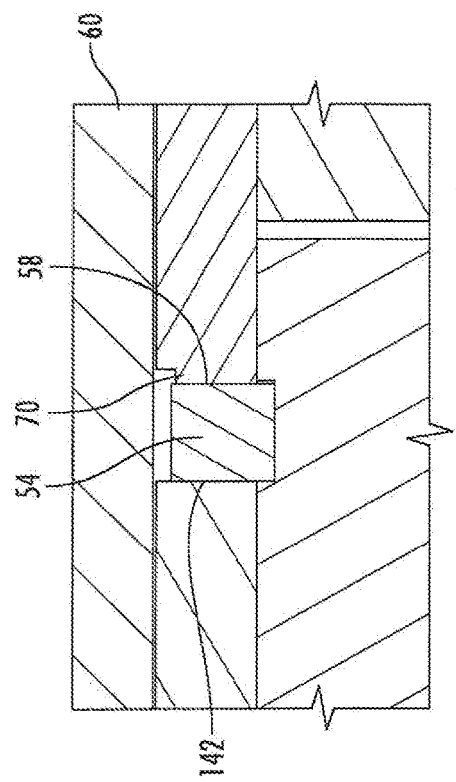
FIG. 4 is an enlarged partial cross-section of a mated pair of hybrid connectors similar to those of FIG. 1, with the connectors shown in an engaged condition with the coupling nut loosened such that the sealing element is relaxed.

As can be seen in FIG. 4 (in a slightly modified embodiment), prior to the tightening of the coupling nut 60, the sealing element 54 is in a relaxed, undeflected condition (FIG. 4 shows the sealing element 54 as having a rectangular cross-section when relaxed). However, as the coupling nut 60 is tightened, the bearing surfaces 142, 58 are drawn toward each other, with the result that the sealing element 54 is compressed. As a consequence of this axial compression, the sealing element 54 expands or bulges radially outwardly to contact the inner surface of the coupling nut 60 (see FIG. 5).

The radially outward expansion of the sealing element 54 can provide two different functions. First, by contacting the inner surface of the coupling nut 60, the bulging sealing element 54 can provide a seal between the inner surface of the coupling nut 60 and the sealing element 54. Second, the bulging of the sealing element 54 into contact with the inner surface of the coupling nut 60 can provide friction that prevents unwanted loosening of the coupling nut 60.

In the illustrated embodiment, the connector 110 is mounted to the wall of an enclosure (such as that described above) for distributing the optical fibers and conductors of a hybrid trunk cable. The connector 10 is connected with a hybrid jumper cable (not shown). However, those skilled in this art will appreciate that the connectors 10, 110 may be attached to or mounted on other components; for example, both connectors may be attached to cables, or both connectors may be mounted on equipment (for example, on a remote radio unit (RRU) that is attached to an antenna).

Figure 6A:
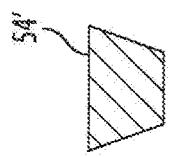
FIGS. 6A and 6B are cross-sections of alternative sealing elements according to embodiments of the invention.
Figure 6B:
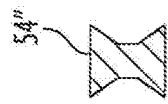

Those skilled in this art will also appreciate that the sealing element may take different forms. Although the sealing element 54 has a generally rectangular cross-section, other shapes may be possible, such as the trapezoidal shape 54' shown in FIG. 6A, the hourglass shape 54" shown in FIG. 6B, and the like. Due to the presences of their angled surfaces that engage the bearing surfaces of the connectors, both the trapezoidal and hourglass shapes may tend to bulge radially outwardly under axial compression.

Figure 5:
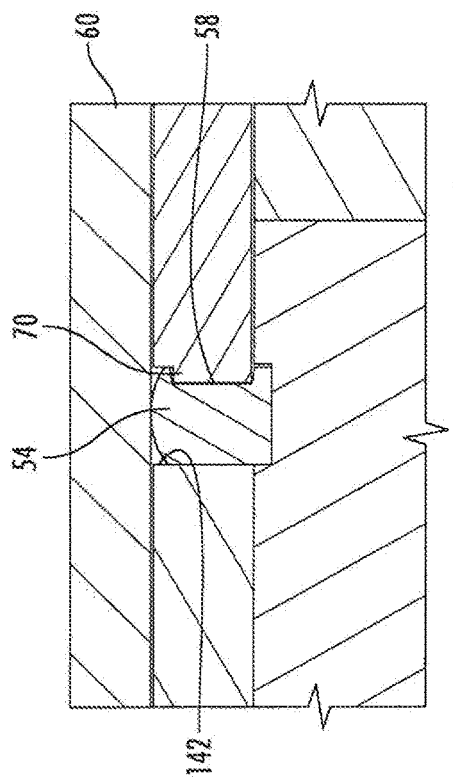
FIG. 5 is an enlarged partial cross-section of the hybrid connectors of FIG. 4, with the connectors shown in an engaged condition with the coupling nut tightened to compress the sealing element.

Also, as shown in FIGS. 4 and 5, it may be beneficial for one or both of the bearing surfaces 58, 142 to have a protrusion (shown at 70 in FIGS. 4 and 5) that encourages radially-outward bulging. A similar effect may be achieved by angling one or both of the bearing surfaces 58, 142.

Further, those of skill in this art will appreciate that other types of connectors may benefit from the concepts discussed herein. For example, coaxial connectors and fiber optic adapters/connectors that rely on a rotating nut for connection may also be suitable. Also, the coupling nut may have any variety of threads or slots that cause the nut to advance axially during rotation of the nut.

While the present invention has been illustrated by the description of the embodiments thereof, and while the embodiments have been described in considerable detail, it is not the intention of the applicant to restrict or in any way limit the scope of the appended claims to such detail. Additional advantages and modifications will readily appear to those skilled in the art. Therefore, the invention in its broader aspects is not limited to the specific details, representative apparatus, methods, and illustrative examples shown and described. Accordingly, departures may be made from such details without departure from the spirit or scope of applicant's general inventive concept. Further, it is to be appreciated that improvements and/or modifications may be made thereto without departing from the scope or spirit of the present invention as defined by the following claims.

That which is claimed is:

1. A connector interface, comprising:
   a first connector having an outer body with a first bearing surface facing in a first axial direction;
   a second connector having an outer body with a second bearing surface facing in a second axial direction opposite the first axial direction;
   a resilient sealing element disposed between the first and second bearing surfaces; and
   a coupling nut associated with the first connector and configured to engage a feature on the second connector;
   wherein rotation of the coupling nut relative to the first and second connectors draws the first and second bearing surfaces toward each other to compress the sealing element such that the sealing element bulges radially outwardly to engage an inner surface of the coupling nut.

2. The connector interface defined in claim 1, wherein each of the first and second connectors includes a plurality of optical fibers and a plurality of electrical conductors.

3. The connector interface defined in claim 1, wherein the sealing element is an annular sealing element.

4. The connector interface defined in claim 1, wherein sealing element has a generally rectangular cross-section.

5. The connector interface defined in claim 1, wherein one of the first and second bearing surfaces has a protrusion that encourages bulging of the sealing element.

6. The connector interface defined in claim 1, wherein the second connector is mounted on an enclosure.

7. A connector interface, comprising:
   a first connector having an outer body with a first bearing surface facing in a first axial direction;
   a second connector having an outer body with a second bearing surface facing in a second axial direction opposite the first axial direction, the second connector being mounted to an enclosure;
   wherein each of the first and second connectors includes a plurality of optical fibers and a plurality of electrical conductors;
   a resilient sealing element disposed between the first and second bearing surfaces; and
   a coupling nut associated with the first connector and configured to engage a feature on the second connector;
   wherein rotation of the coupling nut relative to the first and second connectors draws the first and second bearing surfaces toward each other to compress the sealing element such that the sealing element bulges radially outwardly to engage an inner surface of the coupling nut.

8. The connector interface defined in claim 7, wherein the sealing element is an annular sealing element.

9. The connector interface defined in claim 7, wherein sealing element has a generally rectangular cross-section.

10. The connector interface defined in claim 7, wherein one of the first and second bearing surfaces has a protrusion that encourages bulging of the sealing element.

11. A connector interface, comprising:
    a first connector having an outer body with a first bearing surface facing in a first axial direction;
    a second connector having an outer body with a second bearing surface facing in a second axial direction opposite the first axial direction, the second connector being mounted on an enclosure;
    wherein each of the first and second connectors includes a plurality of optical fibers and a plurality of electrical conductors;
    a resilient sealing element disposed between the first and second bearing surfaces; and
    a coupling nut associated with the first connector and configured to engage a feature on the second connector;
    wherein rotation of the coupling nut relative to the first and second connectors draws the first and second bearing surfaces toward each other to compress the sealing element such that the sealing element bulges radially outwardly to engage an inner surface of the coupling nut.

12. The connector interface defined in claim 11, wherein the sealing element is an annular sealing element.

13. The connector interface defined in claim 11, wherein sealing element has a generally rectangular cross-section.

14. The connector interface defined in claim 11, wherein one of the first and second bearing surfaces has a protrusion that encourages bulging of the sealing element.

* * * * *